United States Patent [19]

Fukui et al.

[11] 4,435,666
[45] Mar. 6, 1984

[54] LEVER ACTUATOR COMPRISING A LONGITUDINAL-EFFECT ELECTROEXPANSIVE TRANSDUCER AND DESIGNED TO PREVENT ACTUATION FROM DEGRADING THE ACTUATOR

[75] Inventors: Izumu Fukui; Takeshi Yano; Takeshige Hamatsuki, all of Tokyo, Japan

[73] Assignee: Nippon Electric Co., Ltd., Tokyo, Japan

[21] Appl. No.: 381,479

[22] Filed: May 24, 1982

[30] Foreign Application Priority Data

| May 26, 1981 | [JP] | Japan | 56-79531 |
| May 26, 1981 | [JP] | Japan | 56-79532 |
| Jul. 17, 1981 | [JP] | Japan | 56-111975 |
| Jul. 17, 1981 | [JP] | Japan | 56-111976 |
| Mar. 25, 1982 | [JP] | Japan | 57-46210 |
| Mar. 25, 1982 | [JP] | Japan | 57-46211 |
| Apr. 13, 1982 | [JP] | Japan | 57-61218 |
| Apr. 30, 1982 | [JP] | Japan | 57-73119 |

[51] Int. Cl.³ .................................................. H01V 7/00
[52] U.S. Cl. ............................. 310/328; 73/517 AV;
73/DIG. 1; 310/323; 310/329

[58] Field of Search ............... 310/328, 329, 345, 351, 310/353, 3; 73/517 AV, DIG. 1

[56] References Cited

U.S. PATENT DOCUMENTS

| 3,649,857 | 3/1972 | Knappe | 310/328 |
| 4,104,920 | 8/1978 | Albert et al. | 73/517 AV |
| 4,349,183 | 9/1982 | Wirt et al. | 267/160 |

Primary Examiner—J. D. Miller
Assistant Examiner—D. L. Rebsch
Attorney, Agent, or Firm—Sughrue, Mion, Zinn, Macpeak & Seas

[57] ABSTRACT

A transducer (51) extended by an electroexpansive longitudinal effect, actuates a lever (77) through a bendable plate (56). Preferably, the plate actuates a first arm (53) having an end which provides the fulcrum. Another bendable plate (79) actuates a second arm (76) having an end which exerts the power to the lever. The plates are symmetrically disposed on both sides of the transducer axis. The lever is differentially actuated by the arms. When such lever actuators are combined into an impact printer head, a guide for printing elements carried by the respective levers are preferably used in preventing the levers from excessively excursing.

9 Claims, 33 Drawing Figures

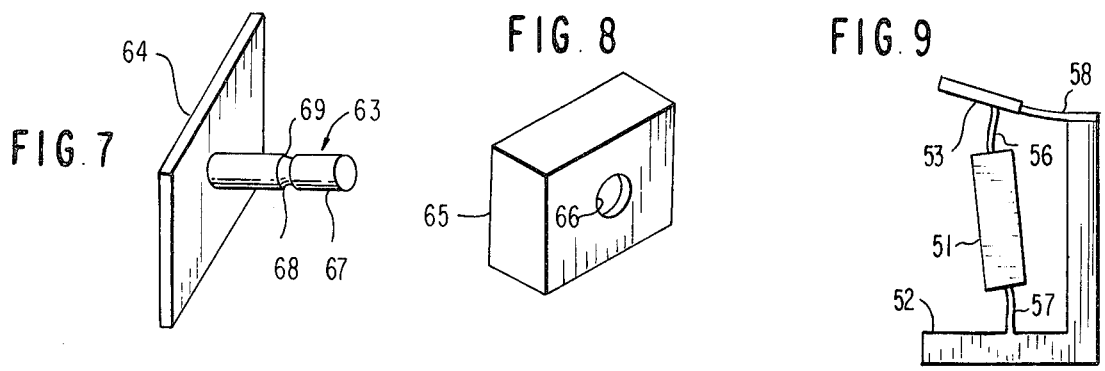
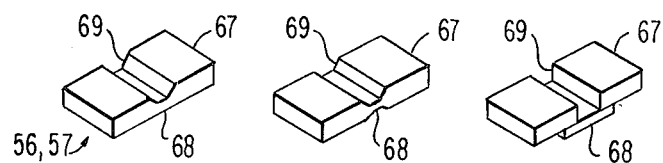
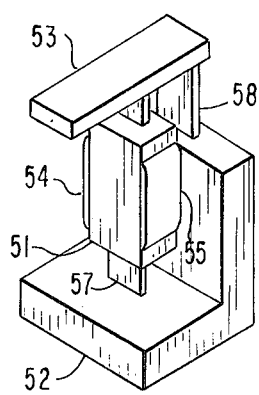
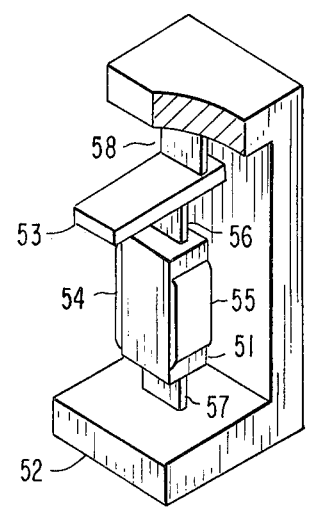

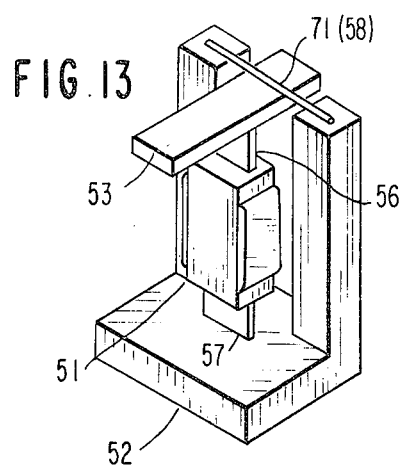
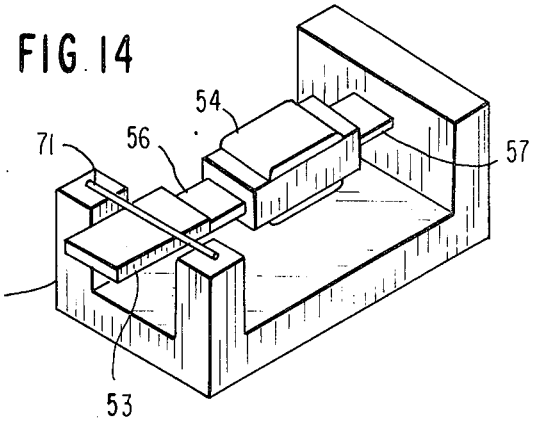
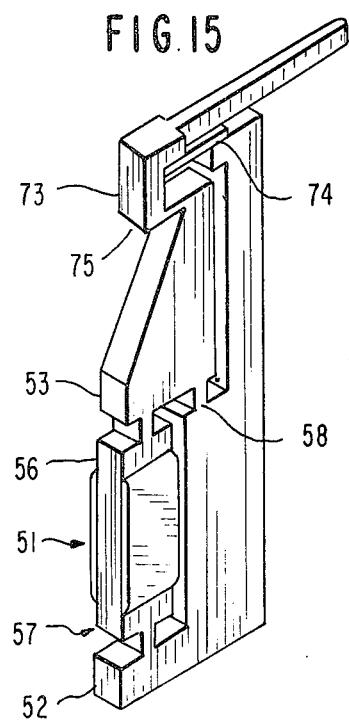
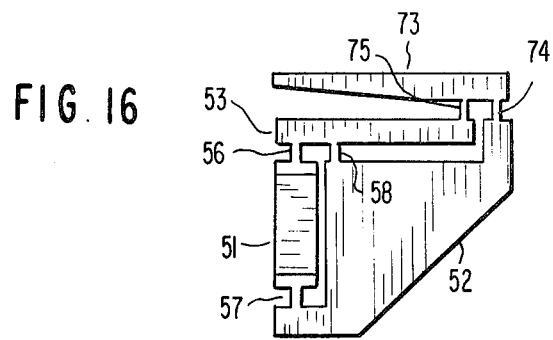
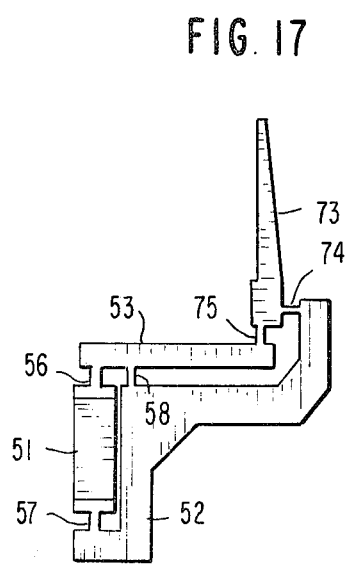
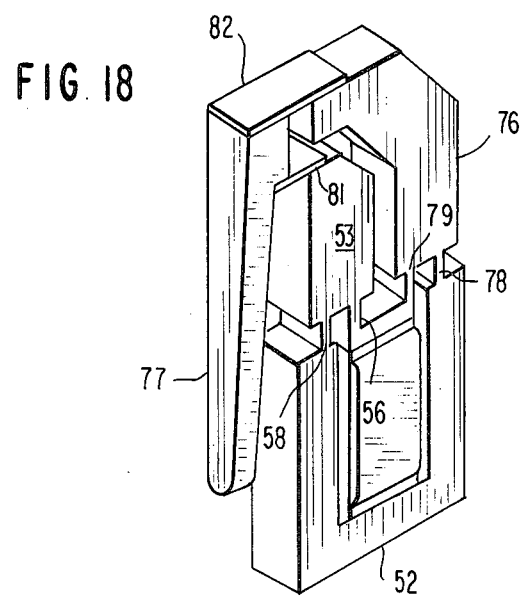

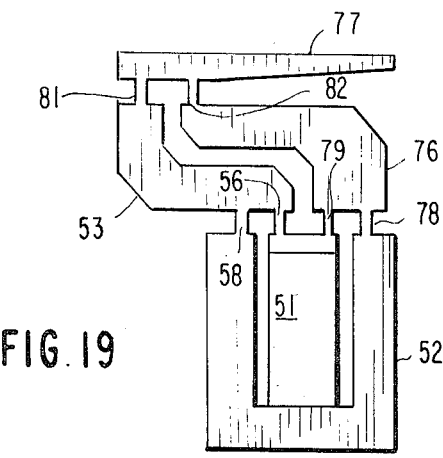
FIG. 19
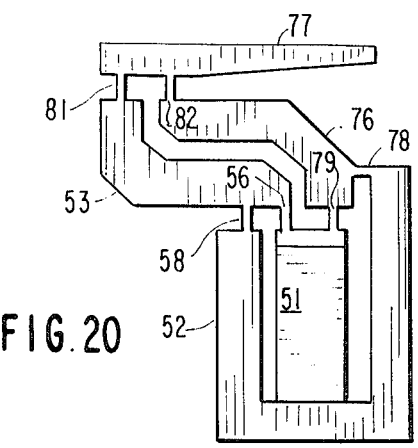
FIG. 20
FIG. 21
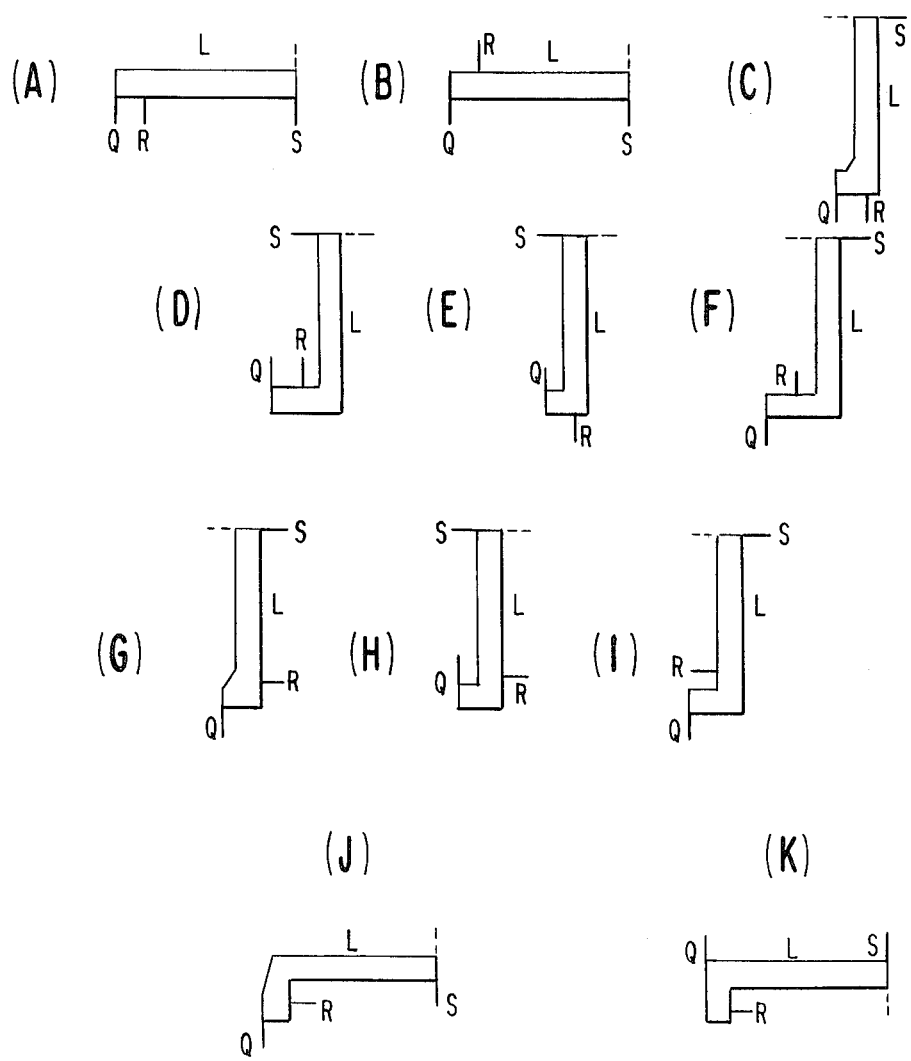

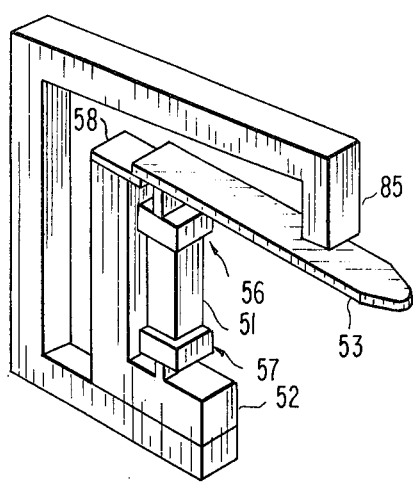
FIG. 22
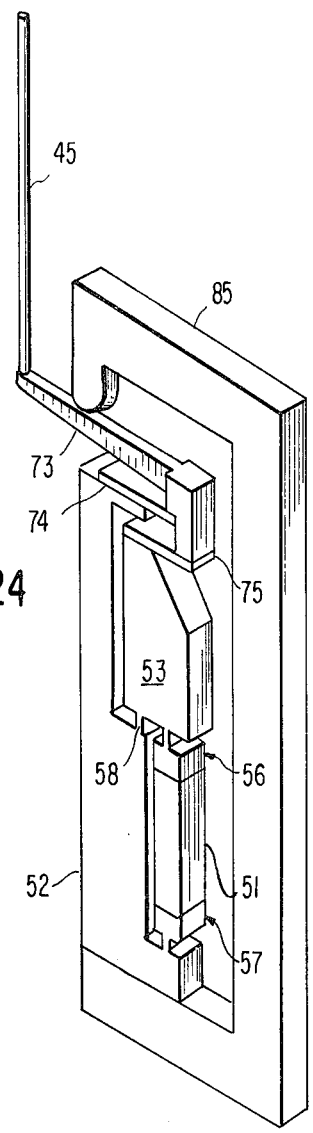
FIG. 24
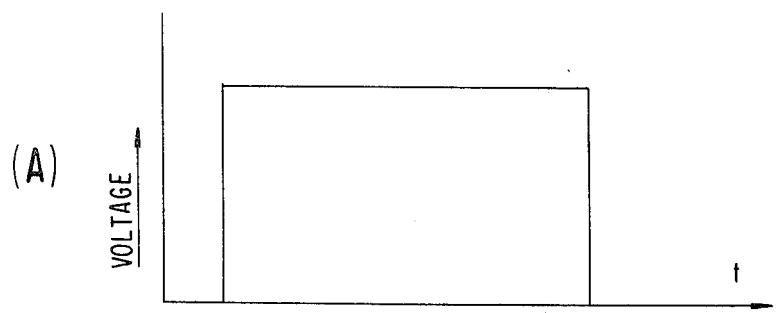
(A)
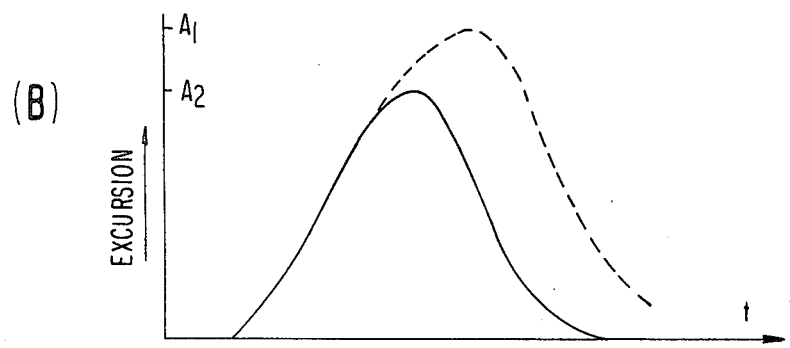
(B)
FIG. 23
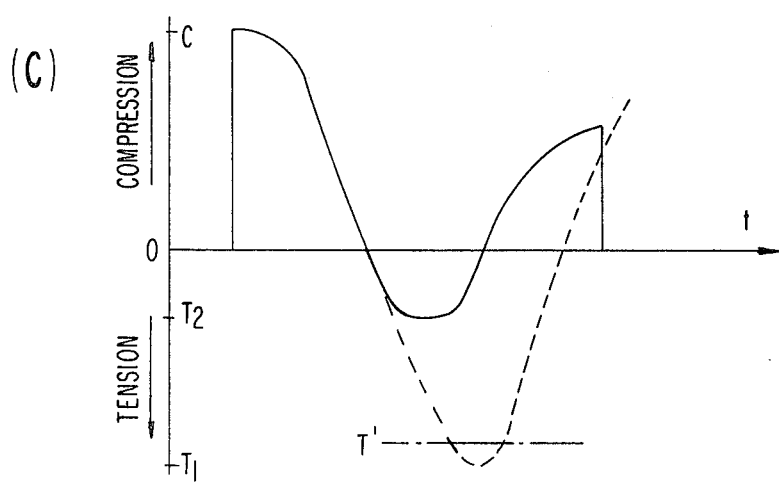
(C)

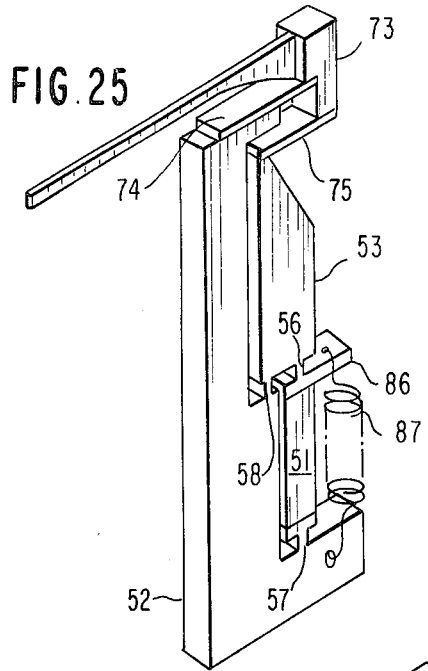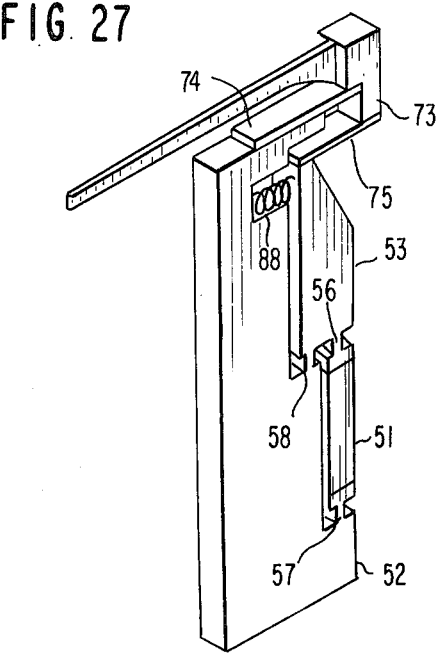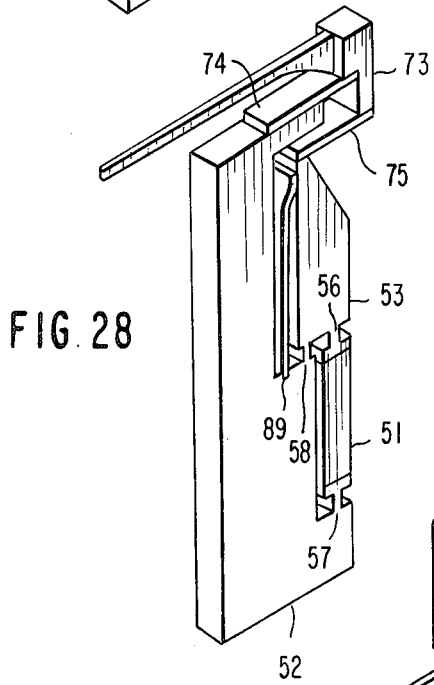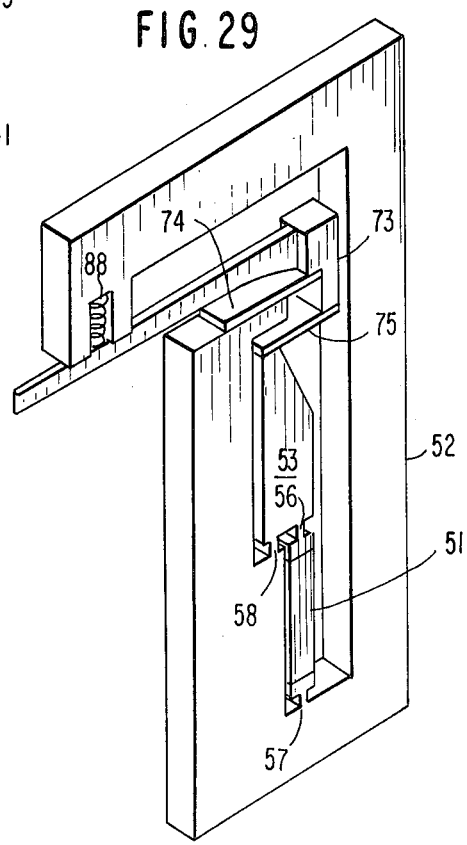

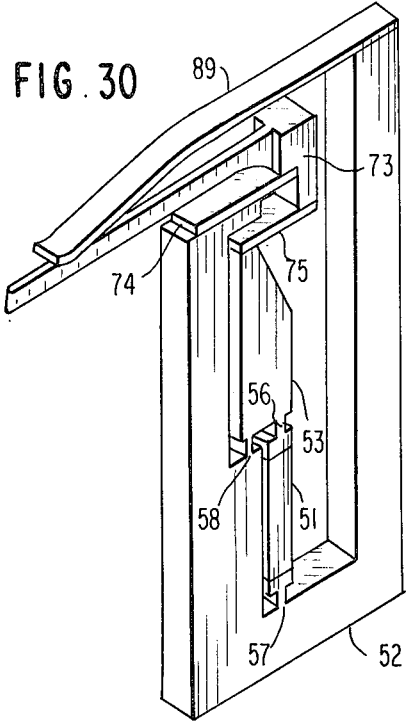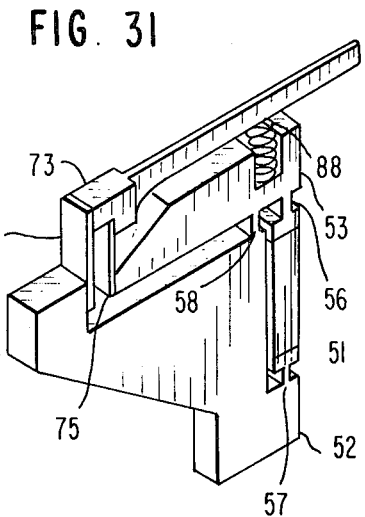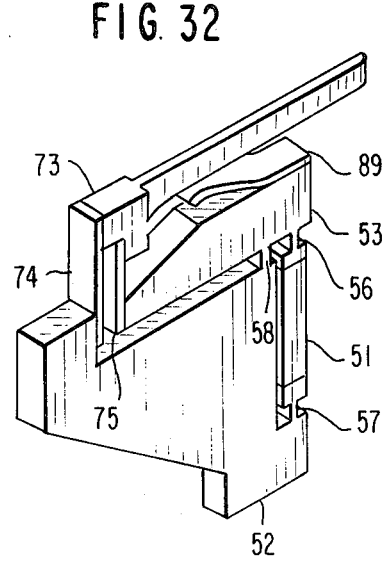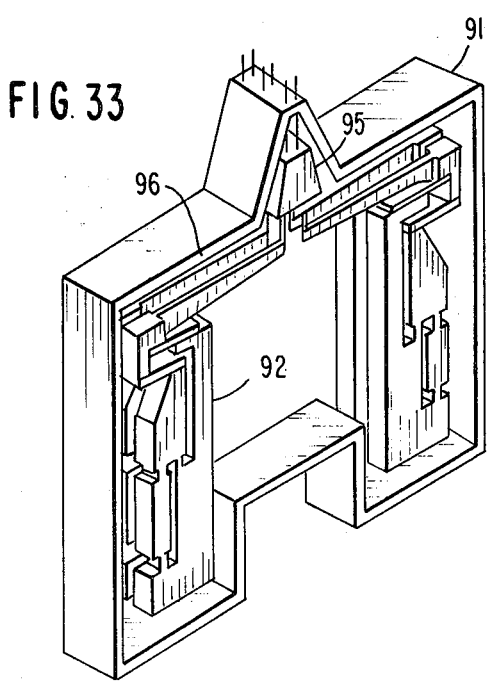

LEVER ACTUATOR COMPRISING A LONGITUDINAL-EFFECT ELECTROEXPANSIVE TRANSDUCER AND DESIGNED TO PREVENT ACTUATION FROM DEGRADING THE ACTUATOR

BACKGROUND OF THE INVENTION

This invention relates to an actuator which comprises a lever and a longitudinal-effect electroexpansive transducer for actuating the lever. A longitudinal-effect electroexpansive transducer comprises a transducer block in which an electrostrictive longitudinal effect in a broader sense is resorted to. A lever actuator according to this invention is specifically useful as an impact printer unit to be employed in combination with a plurality of similar impact printer units as an impact printer head of a dot-matrix printer. This invention relates, more particularly, to the mechanical structure of the lever actuactor although a longitudinal-effect electroexpansive transducer is therein used.

The transducer block is of an axially elongated shape. Responsive to an actuating voltage supplied to the transducer block axially thereof, a strain is reversibly generated therein to axially extend or contract the transducer block. Inasmuch as contraction is a sort of extension unless compressive and tensile strengths are in question, the word "electroexpansive" should be understood to include the notion of "electrocompressive."

The transducer block has a pair of end surfaces. One is supported by a base member of the actuator. Responsive to the strain, the other end surface moves relative to the base member. The lever is supported by a fulcrum at a point, the fulcrum point. The strain generated in the transducer block is transmitted to the lever as a power or force onto another point, the power point. In an impact printer unit, a printing element is carried as a weight or load by the lever at still another point, the weight point, even when a specific weight, such as the printing element, is not carried by the lever.

An actuator comprising a longitudinal-effect electroexpansive transducer is revealed in U.S. Pat. No. 3,614,486 issued to Parker C. Smiley and assigned to Physics International Company and later in U.S. Pat. No. 3,649,857 issued to La Verne F. Knappe, assignor to International Business Machines Corporation. As will later be discussed with reference to one of more than thirty figures of the accompanying drawing, a longitudinal-effect electroexpansive transducer is more preferable in such an actuator than a transducer in which an inverse piezoelectric transverse effect or the like is resorted to.

It has now been found and confirmed as will later be described with reference to a few of the accompanying drawing figures that actuation of the lever in a conventional actuator of the type described results in development of a stress, typically in the transducer block, to such an extent that the stress would degrade the actuator. In this connection, it is worthwhile to note that the transducer is strong against a compressive stress but is weak against tensile and bending stresses. Furthermore, the actuation deforms the base member. The degradation therefore takes place in the transducer block, at an interface of attachment between the transducer block and the base member, and/or in the base member. In addition, development of the bending stress means that electrical energy is wasted in bending the transducer block and others. The degradation therefore occurs also in the efficiency of conversion of electrical energy to mechanical or kinetic energy.

SUMMARY OF THE INVENTION

It is therefore a principal object of the present invention to provide a lever actuator comprising a longitudinal-effect electroexpanisve transducer block, wherein actuation of the lever will not degrade the actuator.

It is another principal object of this invention to provide a lever actuator of the type described, wherein a bending stress is little developed in the transducer block.

It is still another principal object of this invention to provide a lever actuator of the type described, wherein a weight carried by the lever is given a sufficient amount of kinetic energy even with a low actuating electric power.

It is an additional object of this invention to provide a lever actuator of the type described, wherein a tensile stress developed in the transducer block is reduced.

It is another additional object of this invention to provide an impact printer head comprising a plurality of lever actuators of the type described.

A lever actuator to which this invention is applicable, comprises an elongated longitudinal-effect electroexpansive transducer block having a block axis and first and second end surfaces orthogonally of the axis, and field generating means for generating an electric field having a direction in the transducer block parallel to the axis to produce a reversible strain in the transducer block and thereby to give rise to a translational displacement of the first end surface relative to the second end surface in a direction parallel to the axis. The frame member comprises a base portion, a lever portion having fulcrum, power, and weight points with the fulcrum and the power points disposed on a median plane including the axis, a resilient portion connecting the fulcrum point to the base portion, coupling means for operatively coupling the first end surface to the power point, and connecting means for connecting the second end surface to the base portion to make the displacement actuate the lever portion and thereby to move the weight point. According to this invention, the lever actuator is characterised in that the coupling means comprises a substantially plate-shaped primary portion which operatively couples the first end surface to the power point and has a pair of primary principal surfaces disposed perpendicular to the plane and substantially parallel to the axis.

According to an aspect of this invention, the primary principal surfaces are disposed substantially on both sides of the axis.

According to another aspect of this invention, the frame member further comprises a first arm portion having first, second, and third predetermined points with the first and the second predetermined points disposed on the plane, a second arm portion having fourth and fifth predetermined points, a springy portion connecting the first predetermined point to the base portion, a substantially plate-shaped secondary portion which has a pair of secondary principal surfaces disposed substantially parallel to the primary principal surfaces and operatively couples the first end surface to the second predetermined point with the primary principal surface pair and the secondary principal surface pair disposed on both sides of the axis, a first additional portion which has a first portion axis and connects the weight point to the fourth predetermined point with the first portion axis interposed between the weight point and the fourth predetermined point, and a second additional portion which has a second portion axis and connects the third and the fifth predetermined points with the second portion axis interposed between the third and the fifth predetermined points.

Preferably, the strain is a reversible extension. If desired, the lever actuator may further comprise spring means for urging the second end surface towards the first end surface along the block axis.

According to this invention, there is also provided an impact printer head comprising a plurality of lever actuators of one of the types specified hereinabove. The printer head preferably comprises a rod guide having holes through which rod portions of printing elements carried by the respective levers are slidable. The rod guide is made to serve as means for restricting a tensile stress developed in each transducer block on actuation of the lever by the strain generated in that transducer block. When each lever actuator is one according to the later-described aspect of this invention, the printing element is carried by the second arm portion.

BRIEF DESCRIPTION OF THE DRAWING

FIG. 1 shows, partly in section, a side view of a part of a dot-matrix printer comprising a conventional transducer block in which an inverse piezoelectric transverse effect is resorted to;

FIG. 7 is a perspective view of a plate connector piece, which may be used in the lever actuator depicted in FIG. 5;

FIG. 8 is a perspective view of a discrete cup-shaped insulating piece, which may be used together with the plate connector piece depicted in FIG. 6 in the lever actuator illustrated in FIG. 5;

FIG. 9 is a side view of the lever actuator illustrated in FIG. 5 and put into operation;

FIGS. 10 (A), (B), and (C) are perspective views of modified plate-shaped portions, which may be used in the lever actuator shown in FIG. 5;

FIG. 11 is a perspective view of a lever actuator according to a second embodiment of this invention;

FIG. 12 is a perspective view of a lever actuator according to a third embodiment of this invention;

FIG. 13 is a perspective view of a lever actuator according to a fourth embodiment of this invention;

FIG. 14 is a perspective view of a lever actuator according to a fifth embodiment of this invention;

FIG. 15 is a perspective view of a lever actuator according to a sixth embodiment of this invention;

FIG. 16 is a side view of a lever actuator according to a seventh embodiment of this invention;

FIG. 17 is a side view of a lever actuator according to an eighth embodiment of this invention;

FIG. 18 is a perspective view of a lever actuator according to a ninth embodiment of this invention;

FIG. 19 is a side view of a lever actuator according to a tenth embodiment of this invention;

FIG. 20 is a side view of a lever actuator according to an eleventh embodiment of this invention;

FIGS. 21 (A), (B), (C), (D), (E), (F), (G), (H), (I), (J), and (K) are side views of various lever portions for use in a lever actuator according to this invention;

FIG. 22 is a perspective view of a lever actuator according to a twelfth embodiment of this invention;

FIGS. 23 (A), (B), and (C) show schematic diagrams for use in describing operation of the lever actuator depicted in FIG. 22;

FIG. 24 is a perspective view of a lever actuator according to a thirteenth embodiment of this invention;

FIG. 25 is a perspective view of a lever actuator according to a fourteenth embodiment of this invention;

FIG. 27 is a perspective view of a lever actuator according to a fifteenth embodiment of this invention;

FIG. 28 is a perspective view of a lever actuator according to a sixteenth embodiment of this invention;

FIG. 29 is a perspective view of a lever actuator according to a seventeenth embodiment of this invention;

FIG. 30 is a perspective view of a lever actuator according to an eighteenth embodiment of this invention;

FIG. 31 is a perspective view of a lever actuator according to a nineteenth embodiment of this invention;

FIG. 32 is a perspective view of a lever actuator according to a twentieth embodiment of this invention; and FIG. 33 is a partially broken away perspective view of an impact printer head according to an aspect of this invention.

DESCRIPTION OF THE PREFERRED EMBODIMENTS

Figure 1:
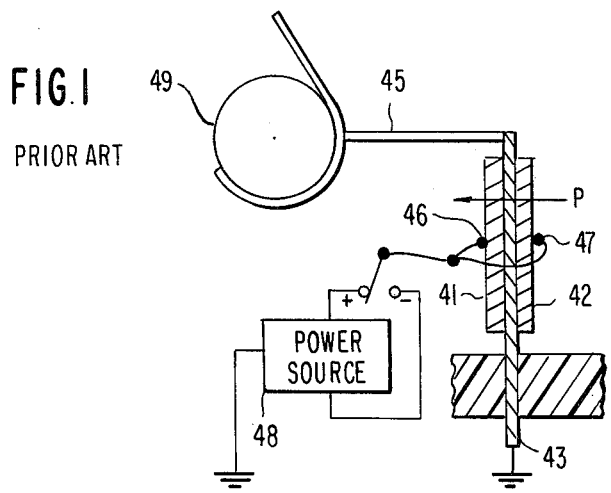

Referring to FIG. 1, a conventional impact printer unit will be described in order to facilitate an understanding of the present invention. It will be assumed that the printer unit makes use of a piezoelectric transverse effect of a piezoelectric material. An inverse piezoelectric effect is now referred to briefly as a piezoelectric effect.

First and second piezoelectric plates 41 and 42, each having a predetermined thickness, are attached to both surfaces of a resilient metal plate 43 to provide an assembly of plates 41 through 43. One end of the metal plate 43 is fixed to a base member. A printing element 45 is carried by the other end of the metal plate 43. Before fixation of the assembly to the base member, first and second electrodes are formed on exposed surfaces of the piezoelectric plates 41 and 42 as symbolised at 46 and 47. The piezoelectric plates 41 and 42 are preliminarily polarized in a direction perpendicular to the metal plate 43 and in the same sense in both piezoelectric plates 41 and 42. In other words, the direction of polarization is horizontal in the figure. The sense of polrazation may, for example, be leftwards as indicated by an arrow P.

The metal plate 43 is grounded. The electrodes 46 and 47 are connected to one terminal of a power source 48, which has the other terminal grounded and supplies the electrodes 46 and 47 with an actuating or driving voltage of, for example, plus 200 volts. The actuating voltage produces an electric field in the piezoelectric plates 41 and 42 parallel to the polarization. In the first piezoelectric plate 41, the electric field has a sense which is opposite to the sense of polarization. In the second piezoelectric plate 42, the electric field has another sense which is coincident with the sense of polarization.

The piezoelectric transverse effect gives rise to extension and contraction of the piezoelectric material in a direction orthogonal to the electric field. It may be assumed that the first and the second piezoelectric plates 41 and 42 contracts and extends, respectively, to bend the assembly. The neutral layer of bending passes through the metal plate 43. The printing element 45 moves leftwards in the figure to print a dot on a recording medium preliminarily placed on a platen 49 and thereby takes part in printing operation.

In order to attain with the piezoelectric transverse effect a sufficient displacement of the printing of the printing element 45 with a satisfactory speed, the printing element 45 must preparatorily be biassed away from the platen 49. The power source 48 must therefore apply the electrodes 46 and 47 with a bias voltage of a polarity opposite to the actuating voltage each time before application of the actuating voltage to the electrodes 46 and 47. Such a bias voltage is necessary also when an electrostrictive transverse effect is resorted to. The word "electrostrictive" will hereinafter be used in a narrower sense.

Typical examples of electroexpansive materials are piezoelectric ceramics, such as lead zirconate titanate, and electrostrictive ceramics, for example, lead manganate niobate. Each electroexpansive material exhibits both longitudinal and transverse effects. The longitudinal effect gives rise to extension and contraction in the direction of the electric field. As described in conjunction with FIG. 1, the piezoelectric material should preliminarily be polarized. Polarization does not take place in the electrostrictive material.

An optional one of such electroexpansive materials will now be taken into consideration. With the longitudinal effect, a greater electromechanical coupling factor (usually more than twice as great) is obtained than with the transverse effect. Efficiency of conversion from electrical energy to mechanical energy is consequently high (by a factor equal to the square of the ratio in the electromechanical coupling factors, that is, about five times). It is therefore possible to get a larger amount of mechanical energy (about five times) with the same actuating power. Furthermore, the longitudinal effect provides a larger strain (by a factor equal of the Poisson's ratio, namely, about three times) than the transverse effect. A greater amount of mechanical energy (by a factor equal to the square of the Poisson's ratio, namely, about nine times) is therefore stored in the material per unit volume. It follows that a less volume (about one ninth) is sufficient to store the same amount of mechanical energy and thereby to give kinetic energy to the printing element exemplified in FIG. 1 at 45. It also follows that the printing element need not preparatorily be biassed and that the impact printer unit is given a higher speed of printing operation.

Figure 2:
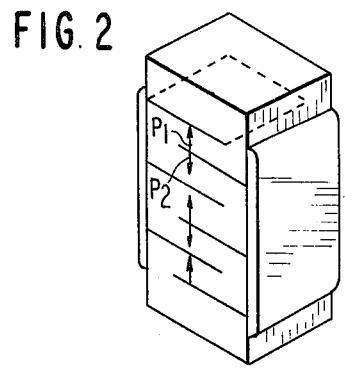
FIG. 2 is a schematic perspective view of a piezoelectric transducer block for use in a lever actuator according to the instant invention.

Turning to FIG. 2, piezoelectric transducer block of the type described in the above-referenced Smiley and Knappe patents, comprises a plurality of piezoelectric pieces. With internal electrodes of a first group and a second group alternatingly interposed, the pieces are stacked together. The first-group electrodes are connected to a first external electrode attached to one side surface of the stack. Likewise, the second-group electrodes are connected to a second external electrode attached to the opposing side surface of the stack. The pieces are polarized in a direction perpendicular to the internal electrodes. Senses of polarization are reversed in the successively stacked pieces as indicated by arrows $P_1$, $P_2$, and so forth. Preferably the piezoelectric pieces have a predetermined thickness.

Figure 3:
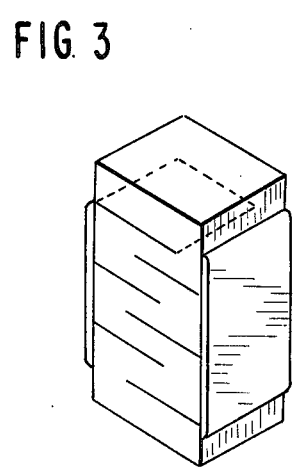
FIG. 3 is a schematic perspective view of an electrostrictive transducer block, which may be used in a lever actuator according to this invention.

Referring to FIG. 3, an electrostrictive transducer block is similar in structure when the longitudinal effect is resorted to. Polarization is not carried out. The electrostrictive materials are featured by little hysteresis. It is therefore possible that the electrostrictive transducer be repeatedly energized at a higher frequency than the piezoelectric transducer.

Figure 4:
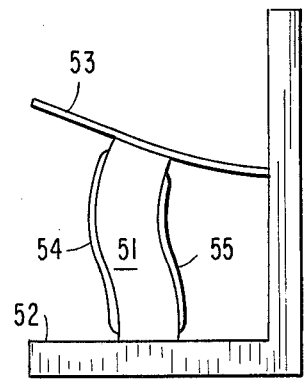
FIG. 4 is a diagrammatical side view of a conventional lever actuator comprising a longitudinal-effect electroexpansive transducer block.

Referring to FIG. 4, a conventional lever actuator comprising a longitudinal-effect electroexpansive transducer block 51, will be described in order to afford a better understanding of this invention. One end surface of the transducer block 51 is attached to a base portion 52 of a frame member. The other end surface is attached to a lever 53, which has a free end and is preferably an integral part of the frame member. The first and the second external electrodes described in connection with FIGS. 2 or 3 are indicated at 54 and 55.

When the transducer block 51 extends, the free end of the lever 53 is lifted in the figure. As exaggeratedly depicted, the transducer block 51 is bent. At least, a bending stress is developed in the transducer block 51. This gives rise to the degradation of the actuator as pointed out heretobefore. Furthermore, it is difficult to render the thickness of an electroexpansive transducer block 51 thin.

Figure 5:
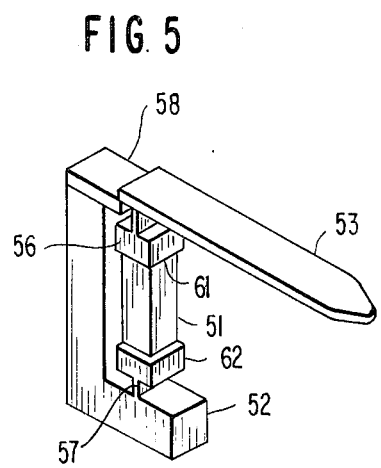
FIG. 5 is a perspective view of a lever actuator according to a first embodiment of this invention.
Figure 6:
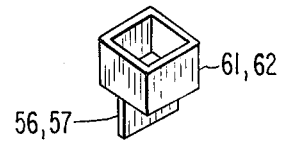
FIG. 6 is a perspective view of a cup-shaped piece used in the lever actuator illustrated in FIG. 5.

Referring now to FIGS. 5 and 6, a lever actuator according to a first embodiment of this invention comprises a frame member and an elongated longitudinal-effect electroexpansive transducer block 51. The frame member comprises a base portion 52 and a lever portion 53 among others. The transducer block 51 comprises a pair of external electrodes (not shown) as described with reference to FIG. 4.

The transducer block 51 has a block axis vertically in the figure and first (upper in the figure) and second (lower) end surfaces orthogonally of the axis. Usually, the end surfaces are similar in outline. The axis passes through geometrical centers of gravity of the respective end surfaces.

The lever portion 53 has fulcrum and power points on a median plane including the block axis. The plane is so called because at least those parts of the lever actuator which are thus far described, are symmetrical on both sides of the plane. The lever portion 53 further has a weight point at or near a free end. The weight point may or may not be present on the plane. When the lever actuator is used in an impact printer unit, a printing element 45 (FIG. 1) is attached to the lever portion 53 as a weight so that a rod portion of the printing element 45 may have an axis aligned with the weight point.

As described in conjunction with FIG. 1, the lever actuator further comprises field generating means for generating an electric field having a direction in the transducer block 51 parallel to the axis. More particularly, the electric field has senses successively reversed at the respective internal electrodes as described with reference to FIGS. 2 or 3. The efectric field generating means is exemplified by leads or electrical connections between the external electrodes and the power source 48 (FIG. 1), which need not be capable of supplying the external electrodes with the bias voltage described in connection with FIG. 1. Due to the longitudinal effect, the electric field produces a strain in the transducer block 51 to give rise to a translational displacement of the first end surface relative to the second end surface in a direction parallel to the axis. It is preferred that the strain be a reversible extension or elongation of the transducer block 51 in the axial direction.

The frame member further comprises a coupling portion which operatively couples the first end surface of the transducer block 51 to the power point of the lever portion 53. The coupling portion comprises a first plate-shaped portion 56 having a first pair of principal surfaces disposed perpendicular to the median plane and parallel to the block axis. The first-pair principal surfaces are disposed on both sides of the axis. A connecting portion connects the second end surface of the transducer block 51 to the base portion 52. The connecting portion comprises a second plate-shaped portion 57 which operatively connects the second end surface to the base portion 52 and has a second pair of principal surfaces disposed on extensions of the respective first-pair principal surfaces. A resilient portion connects the fulcrum point of the lever portion 53 to the base portion 52. The resilient portion comprises a third plate-shaped portion 58 which connects the fulcrum point to the base portion 52 and has a third pair of principal surfaces disposed perpendicular to the plane and form a predetermined angle, such as right angles, with the axis. In the illustrated example, one end of the third plate-shaped portion 58 is formed integral with an end surface of the base portion 52. The end may be rendered integral with the base portion 52 as depicted in FIG. 4.

In the example bing illustrated, the coupling portion further comprises a first cup-shaped portion 61 formed integral with the first plate-shaped portion 56. The first cup-shaped portion 61 snugly receives that portion of the transducer block 51 which is adjacent to the first end surface. A second cup-shaped portion 62 is formed integral with the second plate-shaped portion 57 and snugly receives that portion of the transducer block 51 which is adjacent to the second end surface. Both bottom surfaces, one of which is partly seen in FIG. 6, of the cup-shaped portions 61 and 62 are firmly attached to the transducer block 51 with an adhesive, solder, or the like. For a relatively fragile material, such as the electroexpansive ceramics, the cup-shaped portions 61 and 62 are very effective in keeping the transducer block 51 in excellent mechanical contact with the coupling and the connecting portions, of which the plate-shaped portios 56 and 57 are representative, respectively.

The frame member may be made of metal, such as stainless steel, or a plastic material. Preferably, the frame member comprises the above-described various portions as an integral entirely as far as possible. It will readily be understood that either or both of the coupling and the connecting portions should be manufactured as a discrete member when at least one of the coupling and the connecting portions comprises the cup-shaped piece 61 or 62. The discrete piece may be made of a material that is different from the material of the remaining portions of the frame member. Depending on the material, such a discrete piece is rendered integral with the other portions with solder, an adhesive, or the like to form the frame member. Two of the internal electrodes may be placed at the end surfaces of the transducer block 51 and may belong to different ones of the first and the second groups. Under the circumstances, electrical insulation is necessary at least at a part of a metal frame member, such as at an interface between the coupling or the connecting portion and the transducer block end surface to be brought into contact therewith.

Turning to FIGS. 7 and 8, a rod-shaped portion 63 is rigidly fixed to a plate connector piece 64 having a shape identical in outline with the first or the second end surface of the transducer block 51 (FIG. 5). A discrete cup-shaped insulating piece 65 has a bottom surface on the opposite side of an external surface depicted in FIG. 8. The insulating piece 65 snugly receives the plate connector piece 64 with an exposed surface thereof in contact with the bottom surface and also receives that portion of the transducer block 51 which is adjacent to the first or the second end surface. The bottom surface of the insulating piece 65 has an opening 66 through which the rod-shaped portion 63 can extend. Each or one of the coupling and the connecting portions may comprise such a combination of the rod-shaped portion 63, the plate connector piece 64, and the insulting pice 65 instead of the plate-shaped portion 61 or 62. It is preferred that the external electrodes be included in the transducer block portion received in the insulating piece 65.

Reviewing FIGS. 5 through 8, it is preferred either to rigidly fix each of the plate-shaped portions 56 and 57 to a plate connector piece or portion, such as 64 or to manufacture the former integral with the latter. It is possible to substitute a plate-shaped portion, such as 56 or 57, for the rod-shaped portion 63 with the opening 66 accordingly modified. The insulating piece 65 may be omitted.

Referring to FIG. 9, the fulcrum and the weight points of the lever portion 53 are adjacent as compared with a length thereof. The extension in the transducer block 51 is transmitted to the power point and the base portion 52 through the coupling and the connecting portions, which may be designated by the reference numerals 56 or 63 and 57 or 63, respectively. Inasmuch as the fulcrum point is held by the base portion 52 through the third plate-shaped or resilient portion 58, the lever portion 53 is actuated counterclockwise in the figure around an axis of rotation, which is perpendicular to the median plane and approximately passes through the fulcrum point. The weight point of the lever portion 53 is thereby lifted upwards in the figure. For use in a dot-matrix printer, it is sufficient that the angle of rotation be about one degree. At any rate, an angular displacement is given to the lever portion 53 by the translational displacement of the first end surface of the transducer block 51 relative to the base portion 52.

As depicted in FIG. 9 with exaggeration, each of the plate-shaped portions 56 through 58 is bent. In an extreme case, the block axis may no more lie between the principal surfaces of the first plate-shaped portion 56 and between the principal surface of the second plate-shaped portion 57. The transducer block 51 is little bent so that little bending stress is developed therein. This removes that degradation of the lever actuator which results from the bending stress.

It is now appreciated that the plate-shaped portions, particularly the first and the second ones 56 and 57, are preferably rigid lengthwise and resilient in the direction of thickness. The plate-shaped portion 56 or 57 may have a larger dimension orthogonally of the median plane than in the direction of the block axis. Even in this event, the dimension parallel to the axis is herein referred to as a length because transmission of power or stress is of primary importance. In order to reduce the bending stress which might be developed in the transducer block 51, a straight line defined by the fulcrum and the power points of the lever portion 53, is preferably substantially perpendicular to the block axis.

Turning to FIGS. 10 (A) through (C), the plate-shaped portion 56 or 57 may comprise a thicker part 67 and a thinner part 68. The thicker part 67 has a pair of principal surfaces which serve as the two principal surfaces of the plate-shaped portion 56 or 57. The thinner part 68 is rendered integral with the thicker part 67 and has a thickness thinner than the thicker part 67. The thinner part 68 may be provided by forming an indent 69 in the plate-shaped portion 56 or 57. Alternatively, the thinner part 68 may separately be manufactured and firmly fixed to a pair of such thicker parts, such as 67, with an adhesive, solder, or the like depending on the material. An indent 69 is thereby again formed. As depicted in FIG. 7, such an indent 69 may be formed also in the rod-shaped portion 63. It may be mentioned here that the rod-shaped portion 63 is equivalent to the plate-shaped portion 56 or 57. The two principal surfaces are defined for such an equivalent by a pair of tangential planes. When the indent 69 is formed, the rod-shaped portion 63 also comprises a thicker part 67 and a thinner part 68. The indent 69 of the rod-shaped portion 63 may be recessed from only one of the principal surfaces. At any rate, it should clearly be understood that any one of such portions 56, 57 and 63, with or without an indent, is a substantially plate-shaped portion. The rod-shaped portion 63 is less preferred to the plate-shaped portion 56 or 57 particularly when the indent 69 is formed therein around the circumferential surface as depicted in FIG. 7. This is because a sideslip of the lever portion 53 may occur relative to the median plane.

Referring to FIG. 11, a lever actuator according to a second embodiment of this invention comprises similar parts designated by like reference numerals. The predetermined angle formed by the two principal surfaces of the third plate-shaped portion 58 with the block axis is zero degree when the electric field is not generated in the transducer block 51. The angular displacement given to the lever portion 53 has a magnitude somewhat greater than that achieved by the lever actuator illustrated with reference to FIG. 5. This is because the fulcrum point is held substantially at an original level even when the lever portion 53 is actuated.

Turning to FIG. 12, a lever actuator according to a third embodiment of this invention is similar in structure to that illustrated with reference to FIG. 11. The first and the third plate-shaped portions 56 and 58 are fixed to the lever portion 53 on both sides thereof. It is readily possible to render the distance between the fulcrum and the weight points shorter than that in the lever actuators illustrated with reference to FIGS. 5 and 11.

Referring to FIG. 13, a lever actuator according to a fourth embodiment of this invention comprises similar parts designated by like reference numerals. The base portion 52 has a coplanar surfaces, which are symmetric on both sides of the median plane and form, unless the electric field is generated in the transducer block 51, a prescribed angle with the block axis. The prescribed angle is equal to ninty degrees in the illustrated example. The coplanar surfaces need not be two of leg end surfaces of the base portion 52. The resilient portion 58 comprises a bar-shaped member 71 which has a bar axis disposed perpendicular to the median plane. The bar-shaped member 71 comprises an intermediate portion fixed to the fulcrum point of the lever portion 53. A pair of end portions are rendered torsibly integral with the imtermediate portion along the bar axis and fixed to the coplanar surfaces, respectively. Preferably, the bar-shaped member 71 is a circular metal rod. As an alternative, the bar-shaped member 71 may have a rectangular or an eliptic cross section particularly at the end portions. An indent may be formed between the intermediate portion and each of the end portions like in the rod-shaped portion 63 (FIG. 7).

Inasmuch as a bar-shaped member 71 has a length greater than the width of the lever portion 53, the lever actuator becomes thicker than those illustrated with reference to FIGS. 5 and 11 through 13. It is, however, readily feasible by the use of the bar-shaped member 71 to fix the coupling and the resilient portions 56 or 63 and 58 on both sides of the lever portion 53.

Turning to FIG. 14, a lever actuator according to a fifth embodiment of this invention is similar in structure to the lever actuator illustrated with reference to FIG. 13. The prescribed angle is zero degree unless the electric field is generated in the transducer block 51.

Referring now to FIG. 15, a lever actuator according to a sixth embodiment of this invention comprises similar parts again designated by like reference numerals. The illustrated frame member comprises a bar portion 73 having first, second, and third predetermined points, in addition to the lever portion 53, the first plate-shaped portion 56 or 63, the resilient portion 58, and so on. When the lever portion 53 is called a first lever portion, the bar portion 73 serves as a second lever portion as will presently become clear. The first through the third predetermined points correspond to fulcrum, power, and weight points of the second lever portion 73. The frame member further comprises a springy portion 74 connecting the first predetermined point to the base portion 52 and an additional portion 75 which has a portion axis and connects the second predetermined point to the weight point of the first lever portion 53. The portion axis is interposed between the second predetermined point and the weight point. It is preferred that the first and the second predetermined points be on an additional plane which includes the fulcrum and the weight points of the first lever portion 53 and is parallel to the block axis. The relative translational displacement of the first end surface of the transducer block 51 is twice amplified by the first and the second lever portions 53 and 73 for transmission to the third predetermined point.

Depending on the circumstances, it is possible to understand that the second lever portion 73 is solely a lever portion of the frame member. The first through the third predetermined points are fulcrum, power, and weight points of the lever portion 73, respectively. In this event, the coupling portion comprises an arm portion 53 having fourth, fifth, and sixth predetermined points, the resilient portion 58 connecting the fourth predetermined point to the base portion 52, the first substantially plate-shaped portion 56 or 63 connecting the fifth predetermined point to the first end surface of the transducer block 51, and the additional portion 75 connecting the sixth predetermined point to the power point of the lever portion 73. The connecting portion comprises the springy portion 74 connecting the fulcrum point of the lever portion 73 to the base portion 52.

Turning to FIG. 16, a lever actuator according to a seventh embodiment of this invention comprises similar parts designated by like reference numerals. In contrast to the lever actuator illustrated with reference to FIG. 15 wherein the lever portion 73 has an angle-shaped bar, the lever portion 73 being illustrated is a straight bar.

Turning further to FIG. 17, a lever actuator according to an eighth embodiment of this invention comprises similar parts again designated by like reference numerals. The springy portion 74 and the additional portion 75 are attached to different surfaces of the lever portion 73.

Referring now to FIG. 18, a lever actuator according to a ninth embodiment of this invention is for differentially actuating a differentially actuated lever portion as will shortly become clear. Similar parts are designated by like reference numerals. The base portion 52 comprises a pair of parallel leg portions on both sides of the transducer block 51. In the example being illustrated, a pair of leg end surfaces of the respective leg portions are coplanar. In addition, the base portion 52 further comprises a beam portion which integrally unites the leg portions at parts remote from the respective leg end surfaces to provide a channel-shaped base portion.

Besides the first lever portion 53, the first substantially plate-shaped portion 56 or 63, the resilient portion 58 fixed to one of the coplanar surfaces, and others, the frame member comprises first and second arm portions 76 and 77. The first arm portion 76 serves as a second lever portion and has first, second, and third predetermined points. The second arm portion 77 serves as a third or differentially actuated lever portion and has fourth, fifth, and sixth predetermined points. The frame member further comprises a springy portion 78 connecting the first predetermined point to the other of the coplanar surfaces, an additional substantially plate-shaped portion 79 coupling the second predetermined point to the first end surface of the transducer block 51, a first auxiliary portion 81 connecting the fourth predetermined point to the weight point of the first lever portion 53, and a second auxiliary portion 82 connecting the third and the fifth predetermined points. The first auxiliary portion 81 has a first portion axis interposed between the fourth predetermined point and the weight point. Likewise, the second auxiliary portion 82 has a second portion axis interposed between the third and the fifth predetermined points.

It is to be noted here that the weight point of the first lever portion 53 and the third predetermined point of the first arm portion 76 should move approximately in the same direction with different or substantially reversed senses. In the illustrated example, the weight point and the third predetermined point move in a direction substantially parallel to the coplanar surfaces of the leg portions. The weight point and the third predetermined point move leftwards and rightwards in the figure, respectively.

Like the first substantially plate-shaped portion 56 or 63, the additional substantially plate-shaped portion 79 has a pair of additional principal surfaces disposed substantially parallel to the first-pair principal surfaces, which should now be offset from the block axis. Instead, the first pair and the additional pair should be disposed substantially equidistant on both sides of the block axis. When the plate connector piece (indicated in FIG. 7 at 64) is fixed to the first substantially plate-shaped portion 56 or 63, the additional substantially plate-shaped portion 79 should be fixed to the plate connector piece. As the case may be, it is more convenient to understand that such a plate connector piece in comprised by the transducer block 51.

It is preferred that a second straight line defined by the first and the second predetermined points of the first arm portion 76 be on the median plane. The third predetermined point need not be on the median plane. It is also preferred that the additional substantially plate-shaped portion 79 or 63 comprise a thicker and a thinner part as described with reference to FIG. 7 and 10 (A) through (C).

The first substantially plate-shaped portion 56 or 63 applies a force to the power point of the first lever portion 53. The force acts on the first lever portion 53 as one of a couple, the other of which is used in bending the resilient portion 58. The other of the couple furthermore acts on one of the coplanar surfaces of the leg portions. The first substantially plate-shaped portion 56 or 63 therefore exerts a first force onto the first end surface of the transducer block 51. Similarly, the additional substantially plate-shaped portion 79 or 63 exerts a second force onto the first end surface. It is preferred that the first and the second forces be substantially equal to each other in magnitude, subsatnitally parallel to the block axis, and towards the first end surface. In this event, the connecting portion may merely be a layer of the adhesive, the solder, or the like.

The leg portions need not be parallel. Neither coplanar need be the leg end surfaces. Even under the circumstances, a channel-shaped base portion 52 is less deformed on actuation of the second arm portion 77 and is preferred. The energy wasted is deforming the base portion 52 is reduced.

Depending on the circumstances, it is possible to understand that the differentially actuated lever portion 77 has a fulcrum point resiliently coupled to the base portion 52 by a coupling portion which comprises the first lever portion 53, the resilient portion 58, and the first auxiliary portion 81. The first substantially plate-shaped portion 56 or 63 should be understood as a part of the coupling portion under consideration. The differentially actuated lever portion 77 has a power point connected to the first end surface of the transducer block 51 by a connecting portion which comprises the second lever portion 76, the additional substantially plate-shaped portion 79 or 63, and the second auxiliary portion 82. The springy portion 78 should be included in the connecting portion. Alternatively, the coupling portion comprises the second lever portion 76 and the accompanying portions. The connecting portion comprises the first lever portion 53 and so on. It is also possible to understand that one and the other of the coupling and the connecting portions are a first and a second coupling or connecting portion, respectively, and that one and the other of the first and the second lever portions 53 and 73 are a first and a second bar or arm pontion, respectively.

It is noted in connection with the embodiment illustrated with reference to FIG. 18 that the above-cited Smiley patent teaches an embodiment wherein a differential movement of a pair of lever portions is used to amplify the movement of each lever portion. The embodiment, however, makes use of individual transducer blocks for the respective lever portions. Nothing is suggested by Smiley to use a single transducer block in differentially actuating a third lever portion. In another embodiment taught in the Smiley patent, a pair of protrusions of a block or piece brought into contact with one end of a transducer block, acts on a single flexing beam or lever portion supported at a pair of fulcrum points. An amplified movement of the flexing lever portion and the midpoint is used in moving a single rod. The amplification is, however, less than that achieved by a single ordinary or rigid lever portion. Nothing is suggested by Smiley to use the protrusion pair or coupling or connecting portion pair in moving a pair of individual lever portions.

Turning to FIG. 19, a lever actuator according to a tenth embodiment of this invention comprises similar parts designated by like reference numerals. In the example under consideration, the weight point and the third predetermined points move substantially perpendicular to the coplanar surfaces of the base portion 52. The weight point and the third predetermined point move downwards and upwards in the figure, respectively.

Further turning to FIG. 20, a lever actuator according to an eleventh embodiment of this invention comprises similar parts designated again by like reference numerals. The resilient and the springy portions 58 and 78 are parallel and perpendicular to the block axis, respectively. The leg portions have different lengths.

Referring to FIGS. 21 (A) through (K), each lever comprises a bar L, first and second relatively adjacent connectors Q and R, and a relatively remote connector S. One and the other of the first and the second connectors Q and R are for use as connections to the fulcrum and the power point of a lever, respectively. The remote connector S is for connection to the weight point. The levers may be any one of the first through the third orders as called in the art. The bar L may be straight or L-shaped. Furthermore, the bar L may be modified in such a manner that the connector Q or R and the remote connector S may obliquely intersect each other at their respective extensions. It is possible to select a pertinent one of the illustrated levers as each of the first and the second lever portions 53 and 73 of the lever actuators illustrated with reference to FIGS. 15 through 17 and each of the first through the third lever portions 53, 76, and 77 of the lever actuators illustrated with reference to FIGS. 18 through 20.

Referring now to FIG. 22, a lever actuator according to a twelfth embodiment of this invention comprises similar parts designated by like reference numerals as in FIGS. 5 and 11 through 14. The illustrated lever actuator further comprises a stopper 85 having an end fixed to the base portion 52 and a free end adjacent to the lever portion 53.

Referring to FIGS. 23 (A) through (C) in addition to FIG. 22, let a rectangular actuating pulse voltage of a certain duration be applied to the transducer block 51 as shown in the figure (A). The abscissae of the figures (A) through (C) are representative of time t. The transducer block 51 tends to extend. The lever portion 53 has a certain inertia. Due mainly to the inertia, the weight point remains at a rest position at first as illustrated in the figure (B). A compressive stress therefore develops in the transducer block 51. Before the weight point begins to move, the compression has a maximum magnitude C as indicated in the figure (C).

The weight point soon starts moving as shown in the figure (B). A short interval of time thereafter, the weight point reaches a point of a particular excursion which corresponds to the extension of the transducer block 51. The compression decreases to zero. The lever portion 53, however, continues its rotation. A tensile stress therefore grows in the transducer block 51 as depicted on the negative side of the compression.

If the lever actuator does not comprise the stopper 85, the weight point continues moving as indicated in the figure (B) by a dashed-line curve. In the meantime, the tension grows as shown in the figure (C) by another dashed-line curve until the tension reaches a first maximum magnitude $T_1$ at a certain instant. The maximum magnitude $T_1$ is approximately equal to the maximum magnitude C of the compression. At this instant, the weight point arrives at a point of a first maximum excursion $A_1$ and thereafter moves towards the rest point. Depending on the duration of the actuating voltage, the tension may or may not decrease to zero to revert to the compression. At any rate, the weight point returns to the rest point.

The stopper 85 restricts the excursion to a second maximum excursion $A_2$ as exemplified in the figure (B) by the use of a solid-line curve. The tension is thereby restricted to a second maximum magnitude $T_2$ as shown in the figure (C) by another solid-line cerve. It is possible to restrict the tension from the first maximum magnitude $T_1$ to the second maximum magnitude $T_2$ by a factor equal to four to five.

Numerical examples will be described. Let the impact energy given to the lever portion 53 be 6000 ergs. The first maximum magnitude $T_1$ amounts to 20 kg. It is possible by the stopper 85 to render the second maximum magnitude $T_2$ equal to 5 kg. Let the transducer block 51 have a cross-sectional area of 2 mm × 3 mm. The tensile strength of an electroexpansive ceramic material is typically 300 kg/cm$^2$. The transducer block 51 breaks when the tension grows to a breaking magnitude $T'$ of 18 kg. The transducer block 51 does break with the tension of the first maximum magnitude $T_1$. The tension of the second maximum magnitude $T_2$ never damages the transducer block 51 even repeatedly applied thereto.

It may appear that the stopper 85 is contradictory to the afore-described requirement for a large excursion of the printing element 45 (FIG. 1) in a dot-matrix printer. The printing element 45, however, gives in practice an impact to the recording medium before reaching the first maximum excursion $A_1$. In other words, the excursion of the lever portion 53 is restricted when the lever actuator is used in an impact printer head. Presence and absence of the stopper 85 therefore matters little during ordinary operation of the printer head. It is important to note on the other band that adjustment of a spacing between the printer head and the platen 49 (FIG. 1) is necessary to achieve an optimum printing impact. Furthermore, operation of a printer head alone is necessary during manufacture. In either case, the excursion of the lever portion 53 is not restricted without the stopper 85. An impact printer head is therefore impractical without the stopper 85.

Turning to FIG. 24, a lever actuator according to a thirteenth embodiment of this invention comprises similar parts designated by like reference numerals as in FIGS. 15 through 17. A combination of the lever portions 53 and 73 usually has a greater intertia than the single lever portion 53 used in the lever actuators illustrated with reference to FIGS. 22 and 23 (A) through (C). The stopper 85 therefore plays a vitally important role.

Referring now to FIG. 25, a lever actuator according to a fourteenth embodiment of this invention comprises similar parts designated again by like reference numerals as in FIGS. 15 through 17. The coupling portion comprises a lug portion 86 rendered integral with the first substantially plate-shaped portion 56 (or 63) and projected transversely of the first-pair principal surfaces. A tension coil spring 87 having a pair of coil ends, is interposed between the lug portion 86 and the base portion 52 with the coil ends held thereby to urge the first end surface of the transducer block 51 towards the second end surface thereof. The spring 87 develops a compressive stress of a certain magnitude in the transducer block 51 along the block axis irrespective of presence and absence of an electric field in the transducer block 51.

Figure 26:
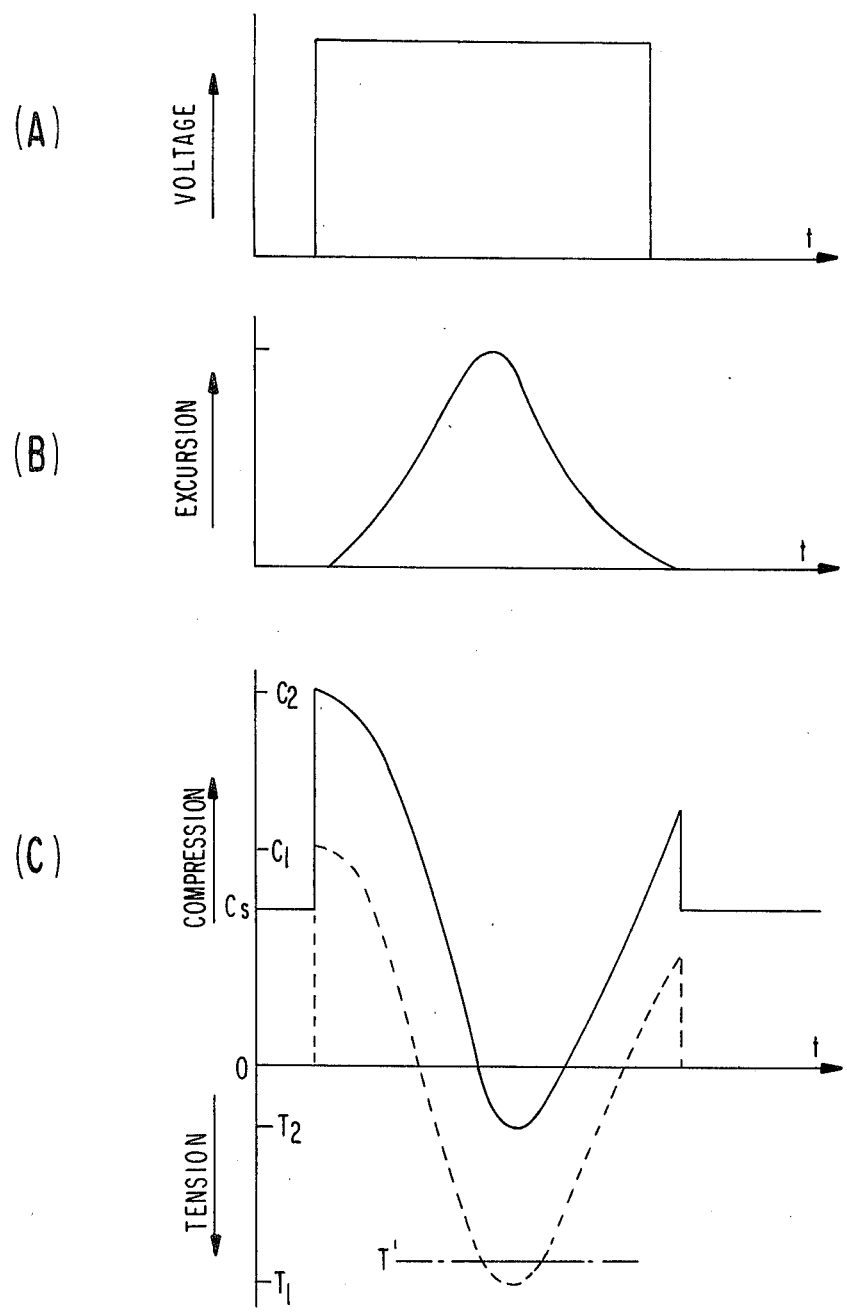
FIGS. 26 (A), (B), and (C) schematically show diagrams for use in describing operation of the lever actuator illustrated in FIG. 25.

Referring to FIGS. 26 (A) through (C) in combination with FIG. 25, let a rectangular-pulse actuating voltage of a certain duration be applied to the transducer block 51 as shown in the figure (A), which is similar to FIG. 23 (A). Like in FIG. 23 (B), the weight point of the lever portion 73 does not depart at first from the rest point as depicted in FIG. 26 (B). Let the tension coil spring 87 develop in the transducer block 51 axially thereof a stationary magnitude of compression $C_s$ shown in FIG. 26 (C).

If the spring 87 were not used, the compression has at this instant a first maximum magnitude $C_1$ which is equal to the maximum magnitude C described in conjunction with FIGS. 22 and 23 (A) through (C). The stress developed in the transducer block 51 would vary as indicated in FIG. 26 (C) by a dashed-line curve with the compression and the tension represented positive and negative, respectively. A first magnitude $T_1$ of the tension is equal to that illustrated in FIG. 23 (C).

In the lever actuator illustrated in FIG. 25, the spring 87 augments the compression to a second maximum magnitude $C_2$ at an instant at which the weight point does not yet move from the rest point. Inasmuch as the electroexpansive ceramics are strong against compression, an increase in the compression from the first maximum magnitude to the second one $C_2$ gives rise to no problem insofar as the breakage of the transducer block 51 is concerned. In any event, a second maximum magnitude $T_2$ of the tension is reduced by a difference equal to the stationary compression $C_s$.

In addition to the numerical examples cited heretobefore, let it now be mentioned that the compressive strength of an electroexpansive ceramic material is 2000 kg/cm$^2$ or more. When the first maximum tension $T_1$ is 20 kg as described before, the stationary magnitude $C_s$ may be as great as 100 kg for the transducer block 51 having the above-mentioned cross-sectional area. In order to suppress the second maximum tension $T_2$ below the breaking magnitude T' of 18 kg. the stationary compression $C_s$ may be only a little more than 2 kg.

Too great a stationary magnitude of compression $C_s$ is, however, objectionable in view of the energy consumption. It is neverthelesss preferred that the stationary compression $C_s$ be about 15 kg in the example being illustrated.

Turning back to FIG. 25, it is possible to fix a fixation end of a leaf spring (not shown) to the lug portion 86 and to let a free end thereof slidably urge a part of the base portion 52 as in any one of the examples to be later described, so as to develop a compressive stress in the transducer block 51 along the block axis. The fixation end may be fixed to the base portion 52 with the free end made to slidably urge the lug portion 86.

Referring to FIG. 27, a lever actuator according to a fifteenth embodiment of this invention comprises similar parts designated by like reference numerals. A compression spring 88 having a pair of coil ends, is interposed between the base portion 52 and the first lever portion 53, which may be called a bar portion as described hereinabove. The coil spring 88 is for urging the first end surface of the transducer block 51 towards the second end surface thereof along the block axis. For this purpose, the base portion 52 has a base portion surface perpendicularly of the median plane. The bar portion 53 has a bar portion surface which faces the base portion surface substantially parallel thereto. The coil ends are received by the base portion surface and the bar portion surface. In the illustrated example, the base portion surface is provided by a bottom surface of an indent for snugly receiving the coil spring 88. Inasmuch as a compression coil spring is used, it is unnecessary to use a hole, such as depicted in FIG. 25, for holding each coil end. Furthermore, the indent is preferred because it becomes possible to use the coil spring 88 even in a narrow space between the base portion 52 and the bar portion 53. It is possible to form such an indent either only in the bar portion 53 or in both the base portion 52 and the bar portion 53.

The first lever portion 53 amplifies the compressive stress developed in the coil spring 88 by actuation or rotation of the second lever portion 73. When the compression is amplified by a first factor equal to five, it is sufficient for the numerical example cited heretobefore that the compression developed in the coil spring 88 be only 3 kg. Depending on the relation between the base portion surface and the bar portion surface, it may become necessary to use a tension coil spring (not shown) although a compression coil spring is preferred.

Turning to FIG. 28, a lever actuator according to a sixteenth embodiment of this invention is similar in structure to the lever actuator illustrated with reference to FIG. 27. A leaf spring 89 is substituted for the coil spring 88.

Referring to FIG. 29, a lever actuator according to a seventeenth embodiment of this invention comprises similar parts designated by like reference numerals. A compression coil spring 88 having a pair of coil ends, is interposed between the base portion 52 and the second lever portion 73, which may be referred to merely as a lever portion. The base portion 52 has a base portion surface perpendicularly of the median plane. The lever portion 73 has a lever portion surface which faces the base portion surface substantially parallel thereto. The coil ends are received by the base portion surface and the level portion surface as described in connection with FIG. 27.

The first and the second lever portions 53 and 73 are operative to amplify the compressive stress developed in the coil spring 88 in two stages. When amplified by the first and the second lever portions 53 and 73 by a first factor equal to five as above and by a second factor equal to ten, the compression developed in the coil spring 88 may be as little as 300 g.

Turning further to FIG. 30, a lever actuator according to an eighteenth embodiment of this invention is similar in structure to the lever actuator illustrated with reference to FIG. 29. A leaf spring 89 is substituted for the coil spring 88.

Referring to FIG. 31, a lever actuator according to a ninteenth embodiment of this invention comprises similar parts designated by like reference numerals. A compression coil spring 88 having a pair of coil ends, is interposed between the first and the second lever portions 53 and 73, which may be called a bar portion and a lever portion, respectively. The bar portion 53 has a bar portion surface perpendicularly of the median plane. The lever portion 73 has a lever portion surface facing the bar portion surface substantially parallel thereto. The coil ends are received by the bar portion surface and the lever portion surface again as described in conjunction with FIG. 27.

The compression developed in the coil spring 88 is amplified by a total factor equal to $n_1/(n_2-1)$, where $n_1$ and $n_2$ are representative of the first and the second factors described hereinabove. According to the numerical example thus far described, it is sufficient that a compression equal only to 330 grams be developed in the coil spring 88.

Turning to FIG. 32, a lever actuator according to a twentieth embodiment of this invention is similar in structure to the lever actuator described with reference to FIG. 31. A leaf spring 89 is substituted for the coil spring 88.

In connection with the lever actuators illustrated with reference to FIGS. 25 and 27 through 32, it is noted that similar coil and leaf springs are used in various embodiments of the above-referenced Smiley patent. In fact, there is a passage to the effect that a return spring, such as an integral leaf spring, assists in keeping a lever in position by maintaining a transducer under "compression" when deenergized (quotation marks ours). According to another part of the patent specification, such a spring is used merely for applying a greater restoring force to the lever. It is therefore believed that the springs are used by Smiley merely to assist restoration of the lever to the rest position. "Compression" is a mere result. It is meaningless according to Smiley to use a tension spring between the end blocks or plates for the transducer.

In contrast, the springs 87, 88, and 89 used in the lever actuators herein illustrated with reference to FIGS. 25 and 27 through 32 are for developing a compressive stress in the transducer block 51 while no electric field is generated therein. As discussed with reference to FIGS. 26 (A) through (C), this is for suppressing the tensile stress developed in the transducer block 51 below the breaking strength. Furthermore, optimum compression magnitudes have been determined.

Finally, referring to FIG. 33, an impact printer head for use in a dot-matrix printer according to an aspect of this invention, comprises a holder 91 and a plurality of lever actuators 92, each of which is of the type illustrated with reference to FIG. 24. The lever actuators 92 are arranged in two rows. The holder 91 may be made of metal, plastics, or a similar material. Depending on the material, the base portions of the respective lever actuators 92 are fixed to the holder 91 with an adhesive, solder, or the like.

A printing element 45 (FIG. 1) is attached to the weight point of the lever portion of each of the lever actuators 92. Each lever actuator therefore serves as a printing element actuator in each impact printer unit. Each printing element 45 has a rod portion.

In order to guide the printing elements so that tips thereof may reach predetermined printing positions, respectively, a rod guide 95 is comprised by the holder 91. The rod guide 95 may be manufactured as a discrete member and fixed to the holder 91. A plurality of holes are bored through the rod guide 95 to slidably guide the respective rod portions.

It is possible to use the rod guide 95 as a common stopper for the lever portions of all lever actuators 92. Alternatively, an arm of the type described in conjunction with FIG. 24 may be attached to the holder 91 or to the base portions of some or all lever actuators aligned along each row as described also in conjunction with FIG. 24. As a further alternative, it is possible to use a shoulder portion 96 of the holder 91 as a common stopper for the lever holders arranged with the lever portions thereof adjacent to the shoulder portion 96. It is preferred even in the last-mentioned case to use the rod guide 95 in raising the accuracy of the printing positions.

While this invention has so far been described in connection with various embodiments and modifications, it will now be readily possible for one skilled in the art to carry this invention into effect in a number of ways. Merely for example, the lever actuators 92 used in the impact printer head illustrated with reference to FIG. 33, may be any one of the lever actuators according to this invention and may differ in structure from one to another. It is preferred in this event that the printing elements of the respective printer units give uniform printing impact to the recording medium preliminarily placed on the platen 49 (FIG. 1).

What is claimed is:

1. In a lever actuator comprising a frame member, an elongated longitudinal-effect electroexpansive transducer block having a block axis and first and second end surfaces orthogonally of said axis, and field generating means for generating an electric field having a direction in said transducer block parallel to said axis to produce a reversible strain in said transducer block and thereby to give rise to a translational displacement of said first end surface relative to said second end surface in a direction parallel to said axis, said frame member comprising a base portion, a lever portion having fulcrum, power, and weight points with said fulcrum and said power points disposed on a median plane including said axis, a resilient portion connecting said fulcrum point to said base portion, coupling means for operatively coupling said first end surfce to said power point, and connecting means for connecting said second end surface to said base portion to make said displacement actuate said lever portion and thereby to move said weight point, the improvement characterized in that:

said coupling means comprises a substantially plate-shaped primary portion which is lengthwise rigid and thicknesswise resilient and which operatively couples said first end surface to said power point and has a pair of primary principal surfaces disposed perpendicular to said plane and substantially parallel to said axis;

and said frame member further comprises a first arm portion having first, second, and third predetermined points with said first and said second predetermined points disposed on said plane, a second arm portion having fourth and fifth predetermined points, a springy portion connecting said first predetermined point to said base portion, a substantially plate-shaped secondary portion which has a pair of secondary principal surfaces disposed substantially parallel to said primary principal surfaces and operatively couples said first end surface to said predetermined point with said primary principal surface pair and said secondary principal surface pair disposed on both sides of said axis, a first additional portion which has a first portion axis and connects said weight point to said fourth predetermined point with said first portion axis interposed between said weight point and said fourth predetermined point, and a second additional portion which has a second portion axis and connects said third and said fifth predetermined points with said second portion axis interposed between said third and said fifth predetermined points, said translational displacement moving said third predetermined point substantially in a direction of movement of said weight point with a different sense.

2. A lever actuator as claimed in claim 1, wherein first and second forces exerted by said primary and said secondary portions onto said first end surface are substantially equal to each other in magnitude, substantially parallel to said block axis, and towards said first end surface.

3. A lever actuator as claimed in claim 2, wherein said base portion comprises a pair of leg portions on both sides of said transducer block, said leg portions having leg end surfaces, respectively, said resilient portion connecting said fulcrum point to one of said leg end surfaces, said springy portion connecting said first predetermined point to the other of said leg end surfaces.

4. A lever actuator as claimed in claim 3, wherein said base portion further comprises a beam portion integrally uniting said leg portions at parts remote from said leg end surfaces to provide said base portion a shape of a channel.

5. A lever actuator as claimed in claim 1, wherein each of said primary and said secondary portions comprises a thicker and a thinner part, said thicker part having a pair of principal surfaces which serve as the two principal surfaces of said each of the primary and the secondary portions, said thinner part being rendered integral with said thicker part and having a thickness thinner than said thicker part.

6. A lever actuator as claimed in any one of the claims 1 and 2 through 5, wherein said strain is a reversible extension, said lever actuator further comprising restricting means for restricting an excursion of the lever portion actuated by said displacement so that a tensile stress developed in said transducer block has a maximum magnitude which is about from one fourth to one fifth of a magnitude of a compressive stress developed in said transducer block in the absence of said restricting means at an instant at which said lever portion starts to move in response to said displacement.

7. A lever actuator as claimed in any one of claims 1 and 2 through 5, wherein said strain is a reversible extension, said lever actuator further comprising spring means between said base portion and said second arm portion, said spring means being for urging said first end surface towards said second end surface along said block axis to develop a stationary compressive stress in said transducer block with a magnitude which is about from one fourth to one fifth of a magnitude of a variable compressive stress developed in said transducer block in the absence of said spring means at an instant at which said lever portion starts to move in response to said displacement.

8. A lever actuator as claimed in claim 7, wherein said spring means is a coil spring having a pair of coil ends held by said base portion and said second arm portion, respectively.

9. A lever actuator as claimd in claim 7, wherein said spring means is a leaf spring having free and fixation ends, one of said base portion and said second arm portion having a portion surface which is disposed to face the other of said base portion and said second arm portion perpendicularly of said median plane and slidably receives said free end, said fixation end being fixed to said other of the base portion and the second arm portion.

* * * * *

UNITED STATES PATENT AND TRADEMARK OFFICE
CERTIFICATE OF CORRECTION

PATENT NO. : 4,435,666
DATED : March 6, 1984
INVENTOR(S) : Izumu FUKI; Takeshi YANO; Takeshige HAMATSUKI It is certified that error appears in the above-identified patent and that said Letters Patent is hereby corrected as shown below:

Abstract, line 6, "exterts" should be --exerts--.
Column 4, line 63, "polrazation" should be --polarization--.
Column 5, line 20, after "displacement", delete "of the printing".
         line 52, "of" should be --to--
         line 64, insert --a-- before "piezoelectric".
Column 6, line 67, "efectric" should be --electric--.
Column 7, line 36, "bing" should be --being--
         line 53, "portios" should be --portions--.
Column 8, line 24, "insulting pice" should be --insulating piece--.
Column 12, line 25, "subsatnially" should be --substantially--.
          line 58, "pontion" should be --portion--.
Column 14, line 22, "cerve" should be --curve--.
Column 15, line 49, "firstmaximum" should be --first maximum--.
Column 16, line 52, "level" should be --lever--.
Column 18, line 44, "surfce" should be --surface--.

Signed and Sealed this

Seventh Day of May 1985

[SEAL]

Attest:

DONALD J. QUIGG

Attesting Officer

Acting Commissioner of Patents and Trademarks